United States Patent [19]

Eckert

[11] Patent Number: 5,056,488
[45] Date of Patent: Oct. 15, 1991

[54] FUEL INJECTION SYSTEM IN PARTICULAR UNIT FUEL INJECTOR, FOR INTERNAL COMBUSTION ENGINES

[75] Inventor: Konrad Eckert, Stuttgart, Fed. Rep. of Germany

[73] Assignee: Robert Bosch GmbH, Stuttgart, Fed. Rep. of Germany

[21] Appl. No.: 508,431

[22] Filed: Apr. 13, 1990

[30] Foreign Application Priority Data

Apr. 21, 1989 [DE] Fed. Rep. of Germany ....... 3913128
Feb. 15, 1990 [DE] Fed. Rep. of Germany ....... 4004610

[51] Int. Cl.$^5$ .............................................. F02M 7/00
[52] U.S. Cl. .................................... 123/446; 123/496; 239/88; 239/91
[58] Field of Search ............... 123/446, 447, 500, 501, 123/496; 239/88-96, 533.1-533.12

[56] References Cited

U.S. PATENT DOCUMENTS

| 4,235,374 | 11/1980 | Walter et al. | 239/90 |
| 4,407,253 | 10/1983 | Bauer | 123/506 |
| 4,489,886 | 12/1984 | Kato | 239/88 |

FOREIGN PATENT DOCUMENTS 3700359 7/1988 Fed. Rep. of Germany .

OTHER PUBLICATIONS

"Bosch-Verteilereinspritzpumpe mit Fliehkraftregler", Bosch Technische Berichte, Band 6, 1978, Heft 2, Bild 15 auf Seite 98 und Seite 99, translation of AR: Bosch-Distributor Injection Pump with Centrifugal Governor, Bosch Technical Instructions, vol. 6, 1978, No. 2, Fig. 15 on pp. 98 and 99.

Primary Examiner—Curt Stuart Miller
Attorney, Agent, or Firm—Edwin E. Greigg; Ronald E. Greigg

[57] ABSTRACT

A fuel injection system for internal combustion engines, having a pump chamber defined by the pump piston and a pressure chamber adapted to communicate with the injection nozzle; and further including an intermediate piston disposed between the two work chambers, in which during the compression stroke of the intermediate piston a throttle conduit which branches off from the pump chamber can be opened, in order to allow some of the fluid to flow out of the pump chamber while leaving the injection quantity located in the pressure chamber unchanged, to thereby attain a lengthening of the injection duration.

12 Claims, 2 Drawing Sheets

FUEL INJECTION SYSTEM IN PARTICULAR UNIT FUEL INJECTOR, FOR INTERNAL COMBUSTION ENGINES

BACKGROUND OF THE INVENTION

The invention is directed to improvements in fuel injection systems, in particular unit fuel injectors.

In a known Diesel injection system of this type (German Offenlegungsschrift 37 00 359), a high degree of freedom in terms of open and closed-loop control interventions in the control processes pertaining to injection is advantageously obtained by the use of an intermediate piston, specifically by providing that quantities of fluid are metered largely independently of one another in two separate chambers, namely the pump chamber and the pressure chamber. One of these fluid quantities, located in the pump chamber determines the supply onset, and hence, depending on the injection quantity stored, the end of injection as well; the second fuel quantity, metered into the pressure chamber, is injected as an unmodified injection quantity. This advantage has a particularly favorable effect in direct injection engines (in contrast to chamber engines), with the high injection pressures they require, where the dictated high feed pressure in the pump chamber and pressure chamber has a not inconsiderable influence on the particular fuel volume, because of the compressibility of the fuel. This change in volume would have a particularly disadvantageous effect given the oblique-edge control means predominantly used in mechanically controlled injection systems, where the quantity control is effected by deviation during the compression stroke.

In the generic injection systems here, contrarily, although a fuel quantity metered into the pressure chamber at low pressure via the metering device is also compressed during the compression stroke, nevertheless it is injected as desired, in the predetermined amount. The compressibility of the fuel cannot have a disadvantageous effect. Since the speed of the pump piston is rpm-dependent, that is, the piston speed is higher, the higher the rpm, and whenever an adequate transmission pressure has been established in the pump chamber as a result of the volume enclosed there, this speed is transmitted directly upon the motion of the intermediate piston; the result is a very short injection duration at high rpm and a corresponding longer injection duration at lower rpm, at the same load or in other words at the same injection quantity. In the short injection duration available at high rpm, a maximum quantity (full load) must necessarily be injectable, and at low rpm this is no problem because of the longer period of time available. Through the various operating ranges, with the injection quantity varying by a factor of from 1 to 30 from idling up to full load, however, this condition means that the available time during idling, which is relatively long because of the low rpm, is not utilized for an optimal injection course, given the relatively small injection quantities during idling. On the other hand, the engine noise is particularly annoying during idling, although it is well-known that lengthening the injection duration, which would theoretically be possible, particularly in the idling range, would lead to a drop in engine noise.

In a known fuel injection system ("Bosch-Distributor Injection Pump with Centrifugal Governor", Bosch Technical Instruction, Vol. 6, 1978, No. 2, FIG. 15 on page 98 and 99; see also U.S. Pat. No. 4,407,253), some of the fuel quantity pumped by the pump piston out of the pump work chamber flows out via a throttle conduit during the compression stroke and during idling, while another portion of the fuel attains injection. The injection quantity required for maintaining idling is nevertheless injected, because the mechanical governor of this injection pump compensates for the portion flowing out via the throttle conduit by correspondingly shifting the diversion of fuel from the pump work chamber occurring during the compression stroke. With this division of the supply quantity, a longer period of time is obtained for the portion to be injected than would be the case if no fluid were to flow out via the throttle conduit.

Although theoretically it would be conceivable to provide such regulation to lengthen the injection duration in the injection system of this generic type, to do so would cancel out some of the originally obtained degree of freedom. Furthermore, at very high injection pressures, the elasticity of the fuel would engender additional control errors, which would be very difficult to correct. This is true particularly for unit fuel injectors, which have a very compact pumping region (pump chamber and pressure chamber) and usually operate at very high pressures (up to 1800 bar).

OBJECT AND SUMMARY OF THE INVENTION

It is a principal object of the fuel injection system now to be discussed and the primary advantage over the prior art that the fuel quantity in the pressure chamber to be injected and metered at low pressure in the intake stroke remains unchanged, even though in idling a corresponding lengthening of the injection duration is attainable. The throttle in the relief conduit has a predetermined constant cross section, so that in combination with the piston speed and hence the effective supply duration per cycle, an effective variation of the injection duration is possible, which decreases with increasing rpm and conversely increases with decreasing rpm, providing an optimal injection duration at a low idling rpm. Depending on the injection quantity pumped during this injection duration, a quantity of fluid flows out of the pump chamber, by which amount the effective injection duration is lengthened. The speed of the intermediate piston is correspondingly slower than that of the pump piston. By the time a certain rpm during idling is attained, the effective cross section of the throttle has become small enough that it no longer affects the injection duration. This effect is attained quickly at increasing rpm, so that a further blocking means in the relief conduit can be dispensed with.

It is a further object of the invention that the throttle conduit can be opened shortly before the end of the compression stroke, but still during the intake stroke of the intermediate piston. Since the idling injection quantities are small, and are injected at the late supply onset for idling, and since the supply onset also depends on the filling ratio of the pump chamber and with a high filling ratio there is usually an early supply onset while with a low filling ratio there is usually a late supply onset. Thus, lengthening of the injection duration is actually effective only if a relatively small supply quantity is actually present, which is injected at the desired late supply onset for idling, so that the influence of this kind of lengthening of the injection duration no longer exists during normal operation, even with earlier injected injection quantities that are small but larger than the idling quantities.

It is still another object of the invention that the throttle conduit is controlled by the intermediate piston. This provides an additional influence on the injection duration lengthening, because the intermediate piston does not interrupt the injection by uncovering a diversion conduit until toward the end of its complete stroke, so that the opening up of the throttle conduit containing the throttle does not take place until within the stroke range of the intermediate piston that is already effective at the remaining stroke corresponding to the idling quantity. With larger injection quantities and a correspondingly longer effective stroke of the intermediate piston serving the purpose of injection, fuel will thus flow out through the throttle conduit only during this remaining stroke, and in that conduit the effect of a lengthened injection duration is lessened or becomes negligibly small.

In yet a further object of the invention, the pump chamber is relieved toward a chamber of lower pressure, by means of the injection piston, toward the end of the compression stroke. As a result, a uniform initial situation for the particular filling of the pump chamber is attained for each further cycle.

In still another object of the invention, the end of supply of injection is effected by the opening up of a diversion conduit of the pressure chamber toward the end of the pump piston compression stroke. This provides a clear break with respect to the end of supply, and the effective injection segment including the injection onset and end of injection, with respect to the rotational angle of the crankshaft, or in a unit fuel injector with respect to the rotational angle of the drive cam, depends on the particular filling ratio of the pump chamber.

In yet another object of the invention, for diverting the pump chamber an annular groove is present in the jacket face of the intermediate piston, and this groove cooperates with an opening, present in the cylindrical bore of the pump chamber, of a relief conduit leading to the chamber of lower pressure; this opening is located upstream in the compression stroke direction of an opening of the throttle conduit. This annular groove provides a clean distinction between throttled outflow and diversion at the end of the compression stroke.

In still a further object of the invention, the opening of the throttle conduit is embodied as a throttle slit extending in the compression stroke direction. This advantageously assures that the throttle cross section in the remaining stroke range will increase with increasing stroke; that is, the cross section of time during this stroke time that is effective for lengthening the injection duration increases.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
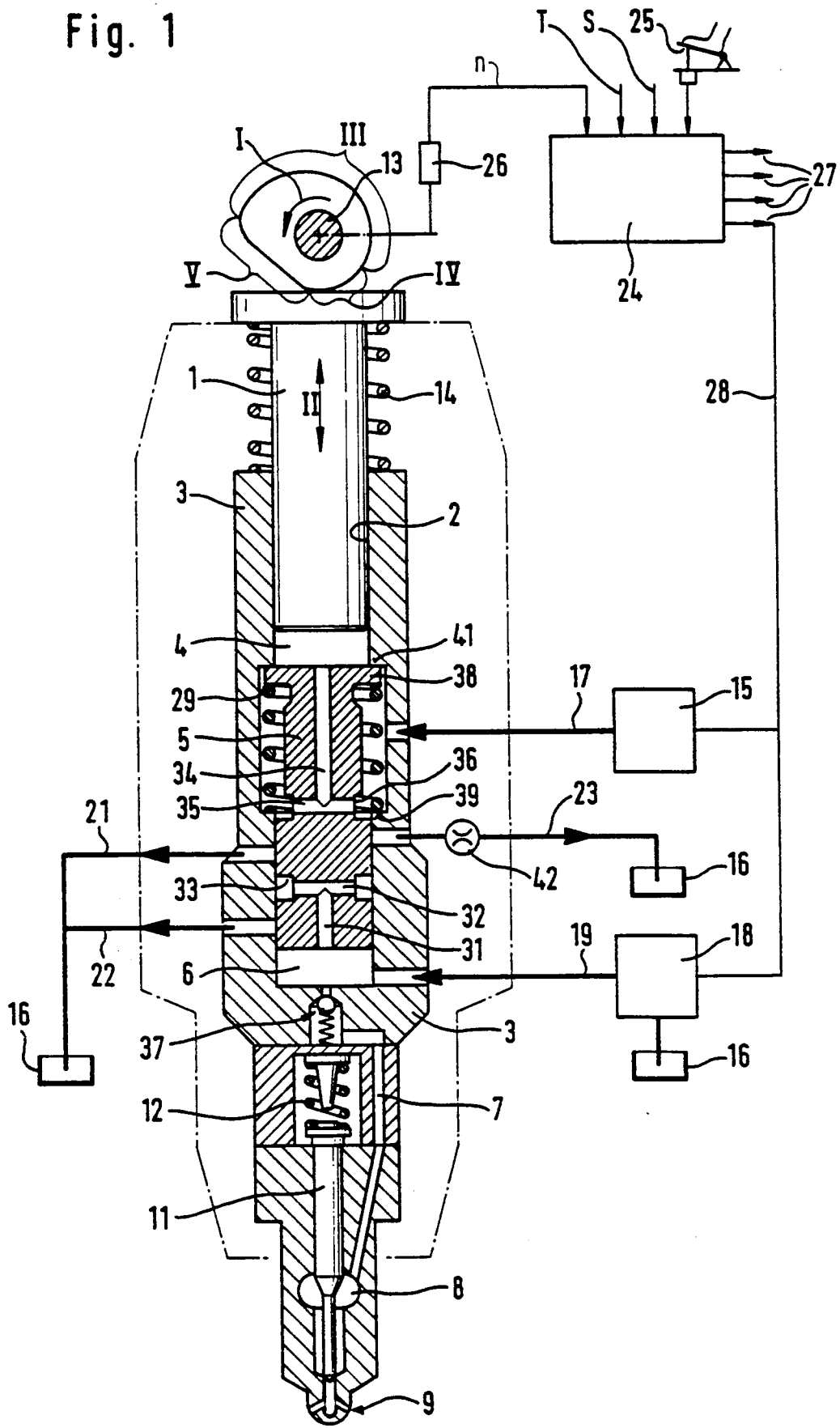
FIG. 1 shows an injection system with a unit fuel injector in longitudinal section, in highly simplified form.

In the injection system having a unit fuel injector as shown in FIG. 1, a pump piston 1 operates in a cylindrical bore 2 of a pump housing 3 and defines a pump chamber 4, which is defined on its other end by an intermediate piston 5 that is likewise axially movably disposed in the cylindrical bore 2. A pressure chamber 6 is provided underneath the intermediate piston 5, communicating via a pressure conduit 7 extending in the housing 3 with a nozzle pressure chamber 8. The injection openings 9 of the unit fuel injector, which lead to a combustion chamber, not shown, are controlled via a valve needle 11 that is loaded by a closing spring 12.

The pump piston 1 is driven for its reciprocating pumping motion by a drive cam 13, rotating in the direction of the arrow I, counter to the force of a restoring spring 14; the reciprocating pumping motion is indicated by a double arrow II.

In this highly simplified illustration, no leakage conduits or arrangements, which are present between the high-pressure part embodied by the unit fuel injector and the low-pressure part to be explained below, and which are necessary for function, are not shown. Associated with this unit fuel injector is a low-pressure fuel system, not shown in further detail here but belonging to the injection system, having a feed pump and fuel metering devices, in particular in the form of magnet valves; these elements are known per se and are not directly pertinent to the invention.

The intermediate piston 5 basically divides the pump chamber 4 from the pressure chamber 6; these two work chambers are supplied with fuel independently of one another. Via a supply onset control device 15, here shown only symbolically as a block and normally including a feed pump and a magnet valve, fuel is metered into the pump chamber 4 from a fuel container 16 via a metering line 17.

There is a corresponding metering device 18 for the pressure chamber 6; this metering device 18 likewise aspirates fuel from the fuel container 16 and pumps it into the pressure chamber 6 via a metering conduit 19. This low-pressure fuel metering into the two work chambers 4 and 6 takes place during the intake stroke of the pump piston 1 or intermediate piston 5.

Branching off from the cylindrical bore 2 are a relief conduit 21 and a diversion conduit 22, which are each opened up by the intermediate piston 5 near its bottom dead center position, so that after that the pump chamber 4 and the pressure chamber 6 are pressure-relieved to the fuel container 16, by means of the relief conduit 21 and the diversion conduit 22, respectively.

Also branching off from the cylindrical bore 2 is a throttle conduit 23 including a throttle 42; this conduit 23 also discharges into the fuel container 16 and is opened up by the intermediate piston 5 during the compression stroke, shortly before the relief conduit 21 or diversion conduit 22.

The supply onset control device 15 and the metering device 18 are triggered by an electronic control unit 24, in order to determine the quantity of fuel to be metered into the pump chamber 4 and pressure chamber 6 and thereby regulate the supply onset or engine rpm. This electronic control unit 24 is supplied with the load via a gas pedal 25 and with the rpm n via an rpm transducer 26, as well as with the temperature T and a further signal S, for instance an exhaust gas figure or an ambient air pressure figure, via two other transducers, not shown. From the outputs 27 of this electronic control unit 24, one output leads as shown via an electrical line 28 to the supply onset control device 15 or to the metering device 18, while the other three outputs 27, in the case of a four-cylinder engine, each lead to one other unit fuel injector having a supply onset control device and a metering device. Naturally, the same feed pump supplies fuel to both the supply onset control device 15 and the metering device 18 of every unit fuel injector.

The intermediate piston 5 is urged in the direction of the pump chamber 4 by a control spring 29. There is an axial blind bore 31, open toward the pressure chamber 6, in the intermediate piston which communicates through a transverse bore 32 with an annular groove 33 disposed on the jacket face of the intermediate piston 5. An axial blind bore 34 open toward the pump chamber 4 is also present in the intermediate piston 5, communicating through a transverse bore 35 with a second annular groove 36 disposed on the jacket face of the intermediate piston 5. Toward the end of the compression stroke of the intermediate piston 5, the annular groove 33 opens the diversion conduit 22, which directly interrupts the injection. The annular groove 36, contrarily, after a certain compression stroke of the intermediate piston 5 has been executed, opens the throttle conduit 23 so that fuel can flow out of the pump chamber 4 in a throttled manner; to terminate the compression stroke of the intermediate piston 5 but also to terminate the compression phase entirely, the groove 36 also opens the relief conduit 21 upon the end of the compression stroke of the pump piston 1.

The metering line 17 and the metering conduit 19 can have a flow through them only in the direction toward the pump chamber 4 and pressure chamber 6, respectively, as indicated by the arrow. This can be achieved by the inclusion of a check valve in the metering line 17. While in the case of the metering conduit 19 fuel can always flow only in this metering direction, for the metering line 17 it is also conceivable for it to have a flow in the opposite direction, in other words toward the supply onset control device 15, depending on whether the metering takes place into the pump chamber 4, by means of a suitably limitedly metered fuel quantity, or whether this chamber is completely filled and upon the compression stroke some of this quantity, pumped into the pump chamber during the intake stroke, can flow back out again, namely until such time as the intended supply onset.

Between the pressure chamber 6 and the pressure conduit 7, there is a pressure valve 37, to prevent a reverse flow from the nozzle pressure chamber 8 to the pressure chamber 6, particularly during the intake stroke.

The course of the contour of the drive cam 13 is divided into three parts, namely an intake stroke part III for a relatively long intake stroke segment; a base circle IV of the cam 13 for a short resting segment; and a compression stroke part V for a steep compression stroke segment. In the working position shown in FIG. 2, the drive cam 13 is just acting upon the pump piston 1 with its base circle IV, just before the compression stroke part V comes into play; as the drive cam 13 continues to rotate, the pump piston is just beginning its downward compression stroke. The pump piston 1 accordingly assumes its top dead center position, which is equivalent to a terminal position after the intake stroke and an initial position before the compression stroke.

In this exemplary embodiment shown, the control spring 29 is supported at one end on a collar 38 of the intermediate piston 5 and on the other on a shoulder 39 of the cylindrical bore 2. The initial position of the intermediate piston 5 shown in FIG. 1 is determined by a shoulder 41 of the cylindrical bore 2.

Figure 2:
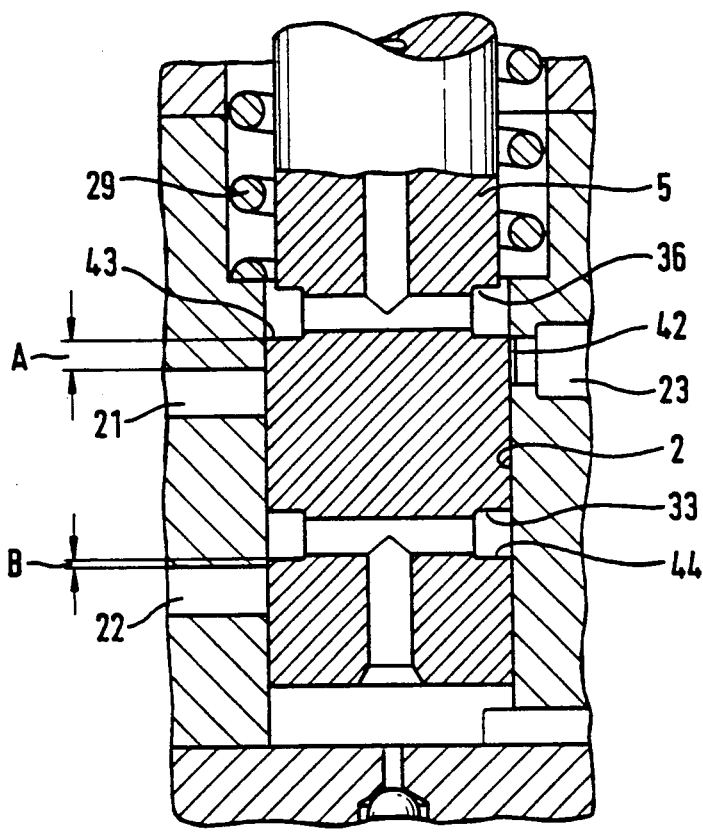
FIG. 2 shows a detail of the unit fuel injector of FIG. 1 in a view showing its structure.

FIG. 2 is a structural view of the middle region of the unit fuel injector, namely the control region of the intermediate piston 5; the throttle 42 in the throttle conduit 23 is embodied as a slitlike opening of the throttle conduit 23 facing toward the cylindrical bore 2. This slitlike throttle 42 cooperates with the lower control edge 43 of the annular groove 36, and FIG. 2 shows the moment at which this lower control edge 43 just begins to open the throttle 42. After the execution of the stroke A, the relief conduit 21 is then opened by this lower control edge 43. The diversion conduit 22, contrarily, is opened up by the lower control edge 44 of the annular groove 33 as soon as the stroke B is executed, so that for the lengthening of the injection duration only this stroke B is effectively operative; that is, there is a relatively shorter stroke than the stroke for opening the throttle 42. At lower rpm, when the cross section of the throttle 42 has a correspondingly major influence given the large time cross section then present, the speed of the intermediate piston 5 is braked severely, because some of the driving fluid is flowing out via the throttle, so that the desired time that is intended to produce the lengthening of the injection duration elapses for the execution of the remaining stroke B; after that, i.e., after the opening of the diversion conduit 22, the injection is suddenly interrupted. Nevertheless, the intermediate piston 5 is displaced into its terminal position in a correspondingly retarded manner, and in that position the pump chamber 4 is also relieved via the annular groove 36 toward the relief conduit 21.

The function of this fuel injection system will now be described, referring to the diagram of FIG. 3. In this diagram, the stroke h of the pump piston 1 in the bottom of the diagram and the stroke z of the intermediate piston 5 in the top of the diagram are plotted on the ordinate, over the rotational angle $\alpha$ of the camshaft 13 on the abscissa. The lower curve describes the travel of the pump piston 1, while the upper curve describes the travel of the intermediate piston 5.

If the pump piston 1 is driven out of its top dead center position shown in FIG. 1, that is, its terminal intake stroke position, by rotating the drive cam 13 in the direction of the arrow I, then the compression stroke part V comes into action, and the pump piston 1 is displaced downward in accelerated fashion in the direction of the arrow II. The total compression stroke part V is equivalent in FIG. 3 to a rotational angle $\alpha V$, calculated from the origin. During a first compression stroke segment $h_S$ of the pump piston 1, gas-filled voids present in the pump chamber 4 are compensated for, so that after the rotational angle $\alpha S$ there is only fluid in the pump chamber 4, and so a high pressure can thereby be developed. The size of the void is determined during the intake stroke by the supply onset control device 15, which meters only a particular fuel quantity into the pump chamber 4. The greater this fuel quantity, the smaller the remaining void to be compensated for during the first compression stroke segment, and the shorter the compensation stroke $h_S$. However, the shorter the compensation stroke $h_S$, the sooner after the buildup of a pressure in the pump chamber 4 will the intermediate piston 5 be driven for its own compression stroke.

The compression stroke of the intermediate piston 5 is effected counter to the force of the control spring 29 and in a first segment namely up to rotational angle $\alpha E$ (FIG. 3), it compensates for a void located in the pressure chamber 6 until here again, because only fuel is still present, a corresponding injection pressure can be established. This injection pressure is determined above all by the injection nozzle, or in other words by the throttling action of the injection openings 9, and by the opening pressure determined by the closing spring 12 and by the cross section of the valve needle 11 acted upon in the opening direction. At that time, the pump piston 1 has executed the stroke $h_E$, while the intermediate piston 5 has executed the correspondingly shorter stroke $z_E$. The effectiveness of the stroke $h_S$ of the pump piston 1 is accordingly dependent on the filling ratio of the pump chamber 4, and the stroke $z_E$ of the intermediate piston 5 until injection can occur at all, which stroke is only enabled thereafter, depends on the filling ratio of the pressure chamber 6. The sum of these two pre-strokes $h_S$ and $z_E$ is the stroke $h_E$ of the pump piston 1 and determines the onset of supply of fuel to the engine, or in other words the injection onset. The actual onset of injection is thus determined not only by the filling ratio of the pump chamber 4 but always by the addition of the filling ratios of both work chambers 4 and 6. This relationship is taken into account via the electronic control unit 24 by way of an injection program; that is, with an increasing injection quantity or in other words for a higher filling ratio in the pressure chamber 6, a corresponding decrease in the filling ratio in the pump chamber 4 is effected for the same supply onset. The extreme cases are a very early supply onset at maximum injection quantity as is the case with full load, and a late supply onset at very low rpm, as is the case during idling. At full load, the stroke $h_S$ is accordingly very short, and so is the stroke $z_E$ of the intermediate piston 5, so that work chambers 4 and 6 are filled to an extremely full extent, while contrarily at idling the pump piston 1 and the intermediate piston 5 have executed an extremely long stroke before a high pressure required for the injection has become established in the pressure chamber 6.

Figure 3:
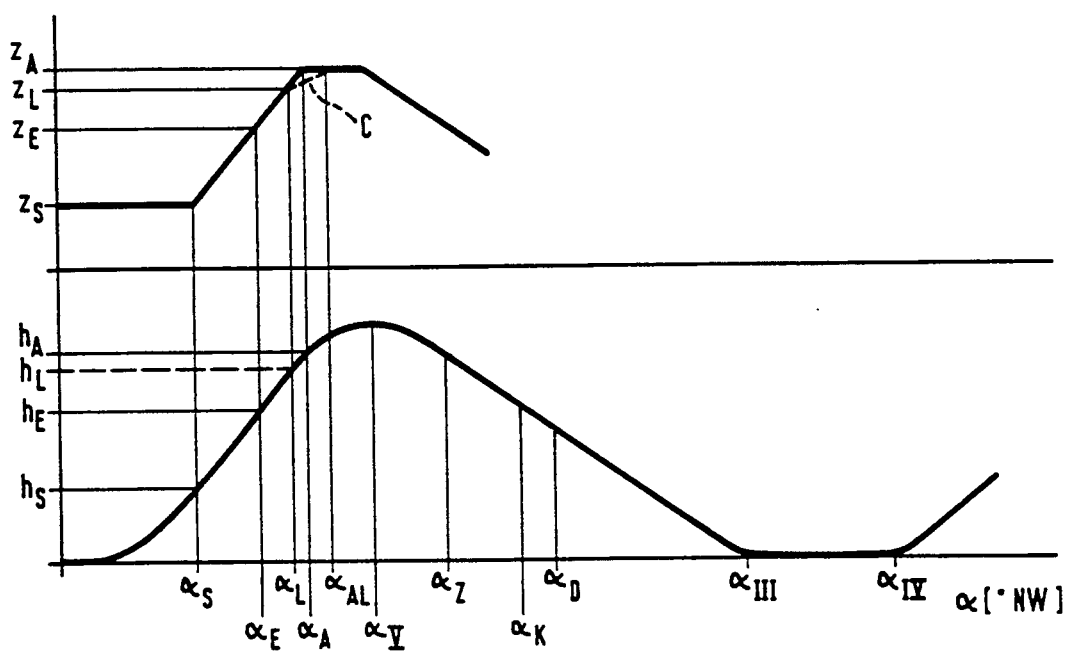
FIG. 3 is a function diagram with curves applying to the pump piston and the intermediate piston one above the other.

In FIG. 2, the intermediate piston 5 is shown in the stroke position identified by $z_L$ in FIG. 3, at which time the lower control edge 43 of the annular groove 36 has just opened the throttle 42 of the throttle conduit 23. Since the annular groove 36 communicates with the pump chamber 4 via the transverse bore 35 and the axial blind bore 34, a throttle outflow from the pump chamber 4 exists from this instant and has a time cross section, such time factor being dependent on the engine rpm and the rpm of the camshaft 13. At this point the time cross section factor depends only on the further stroke of the intermediate piston 5 and on the then additionally exposed slit of the throttle 42. This effective throttle slit enlarges in proportion to the stroke of the intermediate piston 5 and can thus be programmed as a constant factor. The stroke of the intermediate piston 5 is ended at $z_A$, when the lower control edge 43 of the annular groove 36 opens the relief conduit 21, and the pump piston 1 driven onward to rotational angle $\alpha V$ pumps the fuel out of the pump chamber 4 directly to the relief conduit 21. In each case, however, the fuel stored before the intermediate piston 5 in the pressure chamber 6 for injection and metered during the intake stroke is injected via the pressure valve 37, the pressure conduit 7, the nozzle pressure chamber 8 and the injection openings 9 into the engine, until the lower control edge 44 of the annular groove 33 in FIG. 2, after the execution of the stroke B, opens the diversion conduit 22, thereby ending the injection. This is attained after the intermediate piston 5 has covered the stroke $z_A$.

Two different curve course for the same injection quantity are plotted in the upper part of FIG. 3. The solid curves represents higher rpm, at a small injection quantity corresponding to idling, as can occur for instance during overrunning (traveling downhill without depressing the gas pedal), so that the time cross section of the throttle conduit 23, or of the throttle 42, is extremely short and thus has hardly any effect on a lengthening of the injection duration. The upper curve is therefore in a straight solid line, even through in fact, if it were shown exactly, there would be a slight break (which is variable depending on the rpm) in the curve from the point $\alpha_L$ on. Contrarily, the characteristic curve c shown in dashed lines indicates the case in which the rpm is so low, as in idling, that the time cross section of the slitlike throttle 42 is relatively large, and correspondingly more fuel flows out via this throttle from the pump chamber 4 before the diversion conduit 22 is opened by the annular groove 33. While in the first case the injection duration has ended at a rotational angle $\alpha_A$, it is lengthened in the second case until rotational angle $\alpha_{AL}$. This type of control has a certain self-regulating effect because this "automatic" lengthening of the injection duration becomes effective for fuel combustion only when not only are the injection quantities relatively small but also the rpm is relatively low (idling).

Upon further rotation of the drive cam 13 in the direction of the arrow I, the relatively long intake stroke part III comes into action, during which the pump piston 1 and the intermediate piston 5, driven by the restoring spring 14 of the pump piston 1 and the control spring 29 of the intermediate piston 5, return to the initial position shown in FIG. 1. This is attained at a rotational angle $\alpha III$ until after the travel of the base circle IV, that is, at rotational angle $\alpha IV$, a new compression stroke begins. During the intake stroke, once the annular groove 33 is disconnected from the diversion conduit 22, from rotational angle $\alpha Z$, a fuel quantity to be injected in the next injection cycle is metered into the pressure chamber 6 via the metering device 18 and the metering conduit 19. The maximum possible quantity is determined by the possible stroke of the intermediate piston 5, which is defined by the shoulder 41. The intermediate piston 5 strikes this shoulder 41 at the rotational angle $\alpha K$, whereupon in the compression chamber 6, once the metering is ended, a void is created because the control spring 29 displaces the intermediate piston 5 completely against the shoulder 41. No later than after that, the metering of the fuel into the pump chamber 4 by the supply onset control device 15 takes place, to define the onset of supply, and in combination with the injection quantity, to define the end of supply. In each case, however, this metering into the pump chamber 4 does not take place under after the instant when the annular groove 36 is again disconnected from the throttle conduit 23, namely from rotational angle $\alpha D$ on.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection system for internal combustion engines, comprising:
    a fuel injector having a pump chamber provided with a reciprocable pump piston;
    a pressure chamber adapted to supply an injection nozzle of said injector via a pressure line with a quantity of fuel to be injected;
    an intermediate piston hydraulically dividing the pump chamber and the pressure chamber of said injector;
    a metering device associated with said injector delivering the quantity of fuel to be injected to the pressure chamber during an intake stroke of the pump piston;
    means to define a supply onset of the injector by an injection fluid volume present in the pump chamber, said volume being variable in controlled fashion via a metering line;
    and a throttle conduit (23) that branches off from the pump chamber (4), said throttle conduit (23) containing a throttle (42) which is opened by means of the intermediate piston (5) shortly before the end of a compression stroke of the pump piston (1) but still during an effective injection stroke of the intermediate piston (5).

2. A fuel injection system as defined by claim 1, in which the pump chamber (4) is relieved toward a chamber of lower pressure by the intermediate piston (5) toward the end of the compression stroke of the pump piston (1) and in order to terminate the stroke of the intermediate piston (5).

3. A fuel injection system as defined by claim 1, in which the end of supply is effected by the opening of a diversion conduit (22) of the pressure chamber (6) to a chamber (16) of lower pressure, toward the end of the compression stroke, by means of the intermediate piston (5).

4. A fuel injection system as defined by claim 2, in which the end of supply is effected by the opening of a diversion conduit (22) of the pressure chamber (6) to a chamber (16) of lower pressure, toward the end of the compression stroke, by means of the intermediate piston (5).

5. A fuel injection system as defined by claim 1, in which the intermediate piston further includes an annular groove (36) adapted to communicate with the pump chamber (4), which groove cooperates with an opening, present in a cylindrical bore (2) of the pump piston (1), of a relief conduit (21) leading to the chamber of lower pressure, and that this opening is preceded in the compression stroke direction by an opening of the throttle conduit (23).

6. A fuel injection system as defined by claim 2, in which the intermediate piston further includes an annular groove (36) adapted to communicate with the pump chamber (4), which groove cooperates with an opening, present in a cylindrical bore (2) of the pump piston (1), of a relief conduit (21) leading to the chamber of lower pressure, and that this opening is preceded in the compression stroke direction by an opening of the throttle conduit (23).

7. A fuel injection system as defined by claim 4, in which the intermediate piston further includes an annular groove (36) adapted to communicate with the pump chamber (4),which groove cooperates with an opening, present in the cylindrical bore (2) of the pump piston (1), of a relief conduit (21) leading to the chamber of lower pressure, and that this opening is preceded in the compression stroke direction by an opening of the throttle conduit (23).

8. A fuel injection system as defined by claim 3, in which the intermediate piston further includes an annular groove (36) adapted to communicate with the pump chamber (4), which groove cooperates with an opening, present in a cylindrical bore (2) of the pump piston (1), of a relief conduit (21) leading to the chamber of lower pressure, and that this opening is preceded in the compression stroke direction by an opening of the throttle conduit (23).

9. A fuel injection system as defined by claim 5, in which the throttle (42) of the throttle conduit (23) is provided in this conduit leading into the cylindrical bore (2) of the pump chamber (4) and comprises a throttle slit extending in the compression stroke direction.

10. A fuel injection system as defined by claim 6, in which the throttle (42) of the throttle conduit (23) is provided in this conduit leading into the cylindrical bore (2) of the pump chamber (4) and comprises a throttle slit extending in the compression stroke direction.

11. A fuel injection system as defined by claim 7, in which the throttle (42) of the throttle conduit (23) is provided in this conduit leading into the cylindrical bore (2) of the pump chamber (4) and comprises a throttle slit extending in the compression stroke direction.

12. A fuel injection system as defined by claim 8, in which the throttle (42) of the throttle conduit (23) is provided in this conduit leading into the cylindrical bore (2) of the pump chamber (4) and comprises a throttle slit extending in the compression stroke direction.

* * * * *